(12) United States Patent
Anandakrishnan et al.

(10) Patent No.: US 11,704,014 B1
(45) Date of Patent: Jul. 18, 2023

(54) SUPPORTING MICRO SWIPES FOR GENERATING CUSTOM USER INTERFACE RESPONSES

(71) Applicant: Dell Products L.P., Round Rock, TX (US)

(72) Inventors: Bhavani Anandakrishnan, Bangalore (IN); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/051,697

(22) Filed: Nov. 1, 2022

(51) Int. Cl.
*G06F 3/0488* (2022.01)
*G06F 3/0482* (2013.01)

(52) U.S. Cl.
CPC .......... *G06F 3/0488* (2013.01); *G06F 3/0482* (2013.01)

(58) Field of Classification Search
CPC .............................. G06F 3/0488; G06F 3/0482
USPC .......................................................... 715/803
See application file for complete search history.

(56) References Cited

U.S. PATENT DOCUMENTS

| 2021/0097776 | A1* | 4/2021 | Faulkner | G06V 20/20 |
| 2021/0191600 | A1* | 6/2021 | Lemay | G06F 3/04842 |
| 2022/0083197 | A1* | 3/2022 | Rockel | G06F 3/04842 |
| 2022/0091722 | A1* | 3/2022 | Faulkner | G06T 19/003 |

* cited by examiner

Primary Examiner — William D Titcomb
(74) Attorney, Agent, or Firm — Kirton McConkie; Brian Tucker

(57) ABSTRACT

Micro swipes for generating custom user interface responses can be supported. A mobile application can include a micro swipe handler that is configured to detect when a user has performed a micro swipe on a user interface element. The micro swipe handler can interface with a micro swipe management service to determine if any custom user interface response to a micro swipe is associated with the user interface element. If so, the micro swipe management service can provide the custom user interface response to the micro swipe handler which in turn can update the user interface of the mobile application in accordance with the custom user interface response.

20 Claims, 10 Drawing Sheets

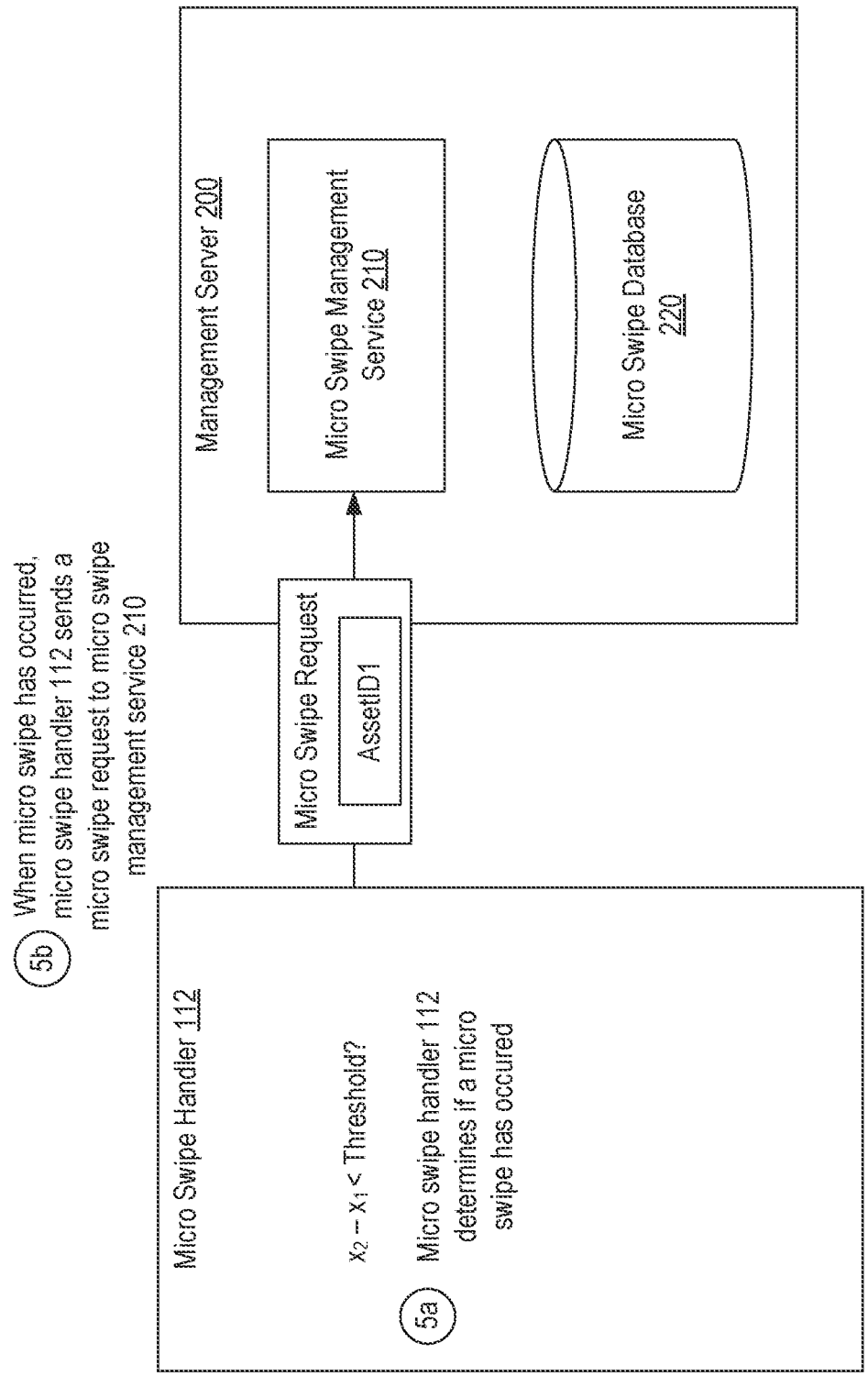

SUPPORTING MICRO SWIPES FOR GENERATING CUSTOM USER INTERFACE RESPONSES

CROSS-REFERENCE TO RELATED APPLICATIONS

N/A

BACKGROUND

When using a web application, a user may hover a cursor over a user interface element (e.g., a hyperlink or a button) to obtain information about the user interface element. This information is typically presented in the form of a tooltip. In contrast, when using a mobile application, there is no cursor that the user can hover over a user interface element. Therefore, there are limited options for a user to obtain information about a user interface element of a mobile application without selecting the user interface element.

BRIEF SUMMARY

The present invention extends to systems, methods and computer program products for supporting micro swipes for generating custom user interface responses. A mobile application can include a micro swipe handler that is configured to detect when a user has performed a micro swipe on a user interface element. The micro swipe handler can interface with a micro swipe management service to determine if any custom user interface response to a micro swipe is associated with the user interface element. If so, the micro swipe management service can provide the custom user interface response to the micro swipe handler which in turn can update the user interface of the mobile application in accordance with the custom user interface response.

In some embodiments, the present invention may be implemented as a method for supporting micro swipes for generating custom user interface responses. A micro swipe handler of a mobile application that is executing on a mobile computing device can detect that a user has performed a swipe on a user interface of the mobile application. The micro swipe handler can determine that the swipe is a micro swipe. In response to determining that the swipe is a micro swipe, the micro swipe handler can send a micro swipe request to a micro swipe management service. The micro swipe handler can receive, from the micro swipe management service, a micro swipe response that defines a custom user interface response. The micro swipe handler can generate the custom user interface response in the user interface of the mobile application.

In some embodiments, the present invention may be implemented as computer storage media storing computer executable instructions which when executed implement a method for supporting micro swipes for generating custom user interface responses. A micro swipe handler of a mobile application that is executing on a mobile computing device can detect that a user has performed a swipe on a first user interface element of a user interface of the mobile application. The micro swipe handler can determine that the swipe is a micro swipe by calculating that a length of the swipe is less than a threshold. In response to determining that the swipe is a micro swipe, the micro swipe handler can send a micro swipe request to a micro swipe management service. The micro swipe request can include an identifier of the first user interface element. The micro swipe handler can receive, from the micro swipe management service, a micro swipe response that defines a custom user interface response. The micro swipe response can be associated with the identifier of the first user interface element. The micro swipe handler can generate the custom user interface response in association with the first user interface element in the user interface of the mobile application.

In some embodiments, the present invention may be implemented as a system that includes a management server hosting a micro swipe management service and at least one mobile computing device on which a mobile application is installed. The mobile application can include a user interface and a micro swipe handler. The micro swipe handler can be configured to implement a method for supporting micro swipes for generating custom user interface responses in the user interface while the user interface is displayed on the respective mobile computing device. The micro swipe handler can detect that a user has performed a swipe on a first user interface element in the user interface. The micro swipe handler can determine that the swipe is a micro swipe. In response to determining that the swipe is a micro swipe, the micro swipe handler can send a micro swipe request to the micro swipe management service. The micro swipe handler can receive, from the micro swipe management service, a micro swipe response that defines a custom user interface response. The micro swipe handler can cause the user interface to be updated to include the custom user interface response.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3G provide an example of how micro swipes for generating custom user interface responses can be supported in accordance with embodiments of the present invention.

DETAILED DESCRIPTION

Figure 1:
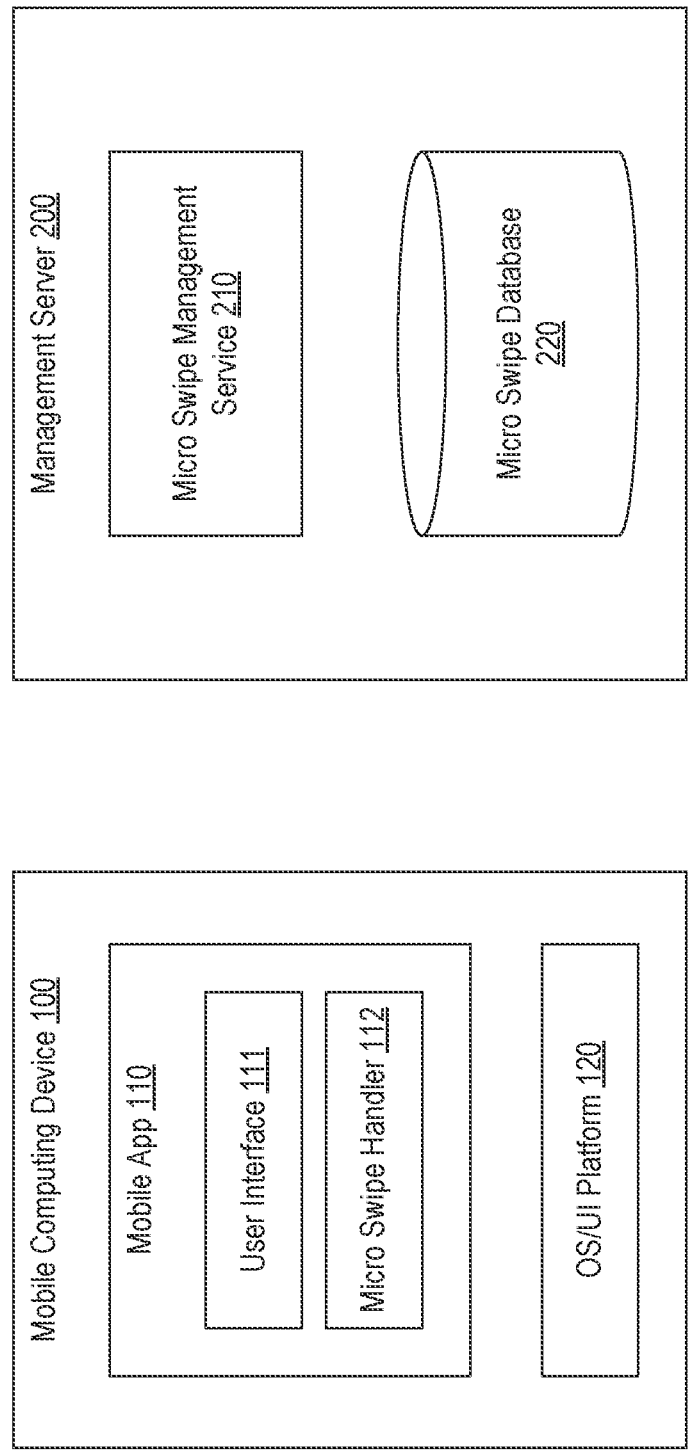
FIG. 1 provides an example of a computing environment in which embodiments of the present invention may be implemented.

FIG. 1 provides an example of a computing environment in which embodiments of the present invention may be implemented. This computing environment includes at least one mobile computing device 100 and a management server 200. Mobile computing device 100 can be any computing device that is capable of executing a mobile application (or app) 110. As examples, mobile computing device 100 could be a smart phone, a tablet, or another computing device that receives user input via a touch screen. Mobile computing device 100 may have an operating system 120 that includes or supports a user interface platform. As one example only, operating system 120 could be iOS or Android and a user interface platform such as Flutter may be installed on mobile computing device 100.

Management server 200 can represent any hardware arrangement on which a micro swipe management service 210 may be hosted and made accessible to mobile computing device 100 via network communications. For example, management server 200 could represent a standalone server computing device, a virtual machine, or a cloud. Management server 200 can also maintain or provide access to a micro swipe database 220 in which micro swipe responses may be defined and maintained.

Mobile app 110 can represent any application that is configured to run on mobile computing device 100 and that includes a user interface 111 and a micro swipe handler 112. In this description, mobile app 110 will be described as an inventory management app (e.g., MyDell Mobile) that individuals or administrators may use to manage their or an entity's computing devices and/or other hardware.

User interface 111 can represent the computer-executable instructions that define which user interface elements are included in mobile app 110's user interface and corresponding functionality. Micro swipe handler 112, which could be considered part of user interface 111, can represent one or more components that are configured to detect at least some types of user input to user interface 111. Of most relevance, micro swipe handler 112 can be configured to detect when a user is performing or has performed a swipe on or over a user interface element and to determine if the swipe constitutes a micro swipe. As one example only, if the UI platform is Flutter, micro swipe handler 112 could comprise a GestureDetector.

Figure 2:
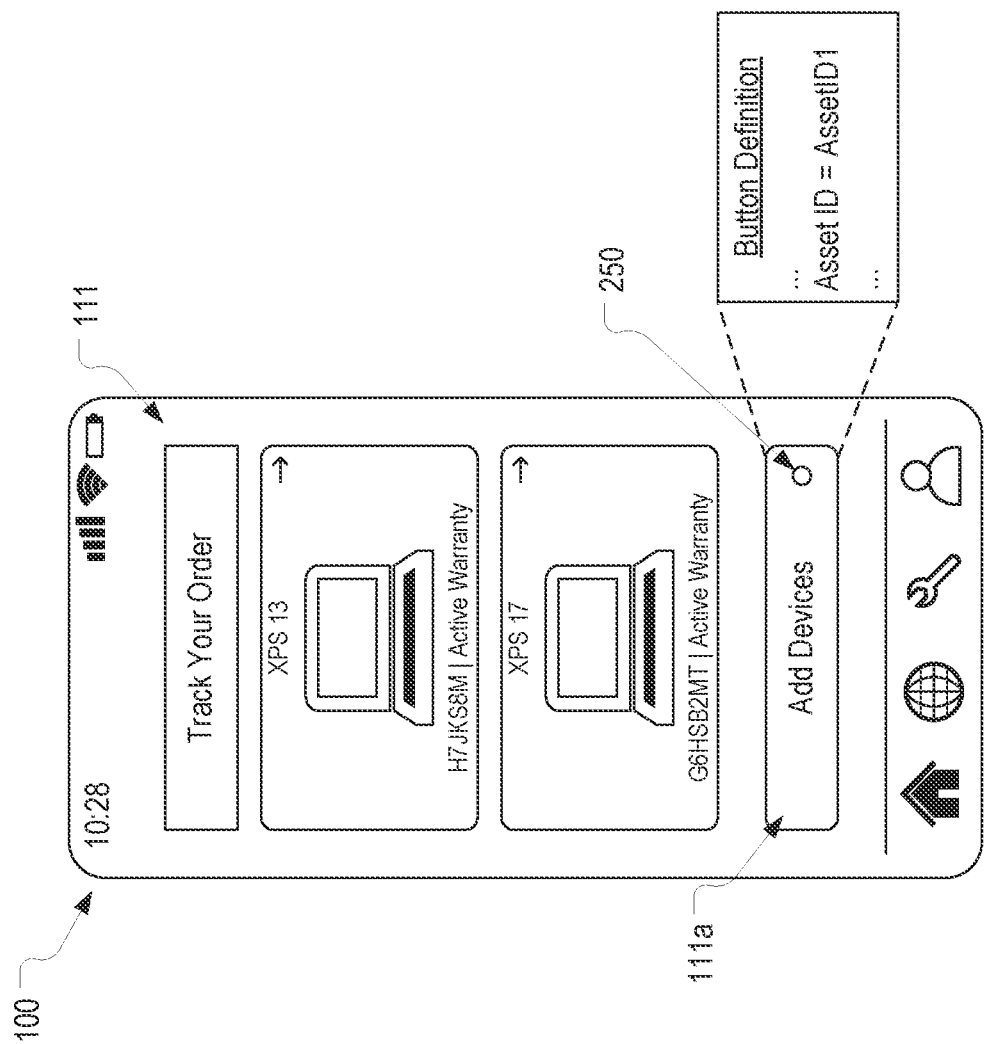
FIG. 2 provides an example of a user interface of a mobile application that is configured to support micro swipes for generating custom user interface responses in accordance with embodiments of the present invention.

FIG. 2 provides an example of user interface 111 (or a screen of user interface 111) may appear on mobile computing device 100. In this example, user interface 111 provides information about computing devices the user or administrator (hereafter user) has added to mobile app 110 and also provides a button 111a by which the user can add addition computing devices, among other things. Button 111a includes a micro swipe support indicator 250, which in this case is a circle, which functions to inform the user that button 111a supports micro swipes. In other words, a user interface element that supports micro swipes may be modified to include micro swipe support indicator 250. Each user interface element that supports micro swipes may also be associated with an asset ID. For example, in FIG. 2, button 111a is assumed to be associated with an asset ID of AssetID1.

FIGS. 3A-3G provide an example of how micro swipes for generating custom user interface responses can be supported in accordance with embodiments of the present invention. This example will be described in the context of button 111a but the described functionality could be similarly performed for any other user interface element that supports micro swipes.

Figure 3A:
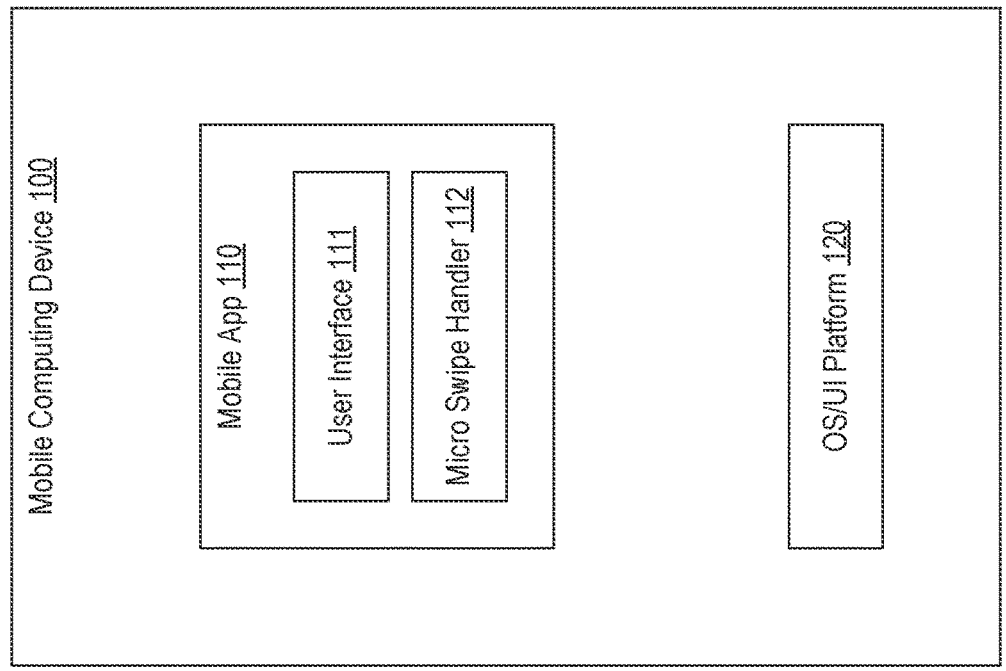
Figure 3A:
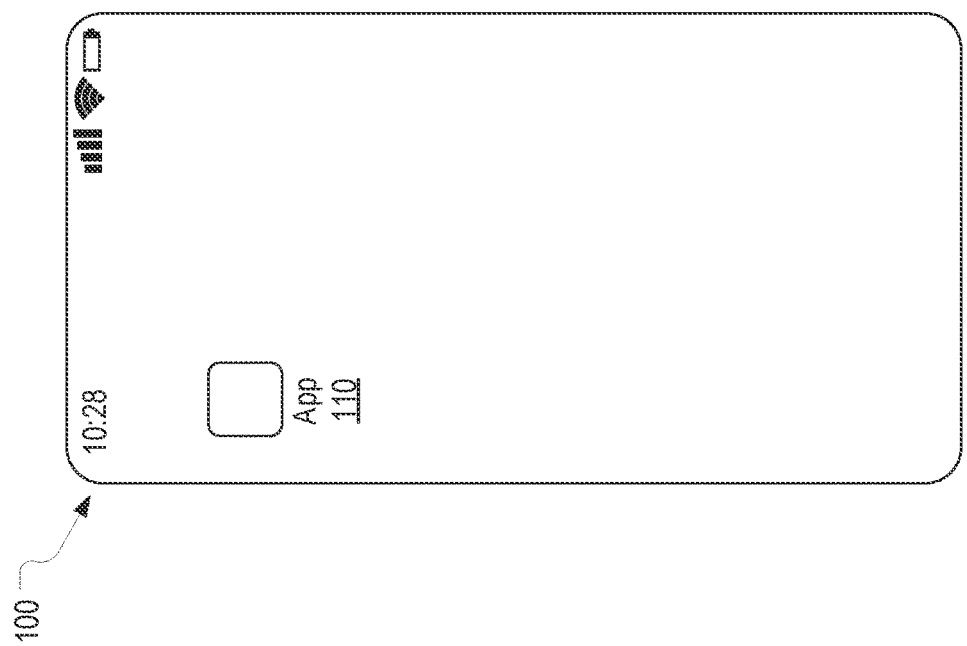
Figure 3B:
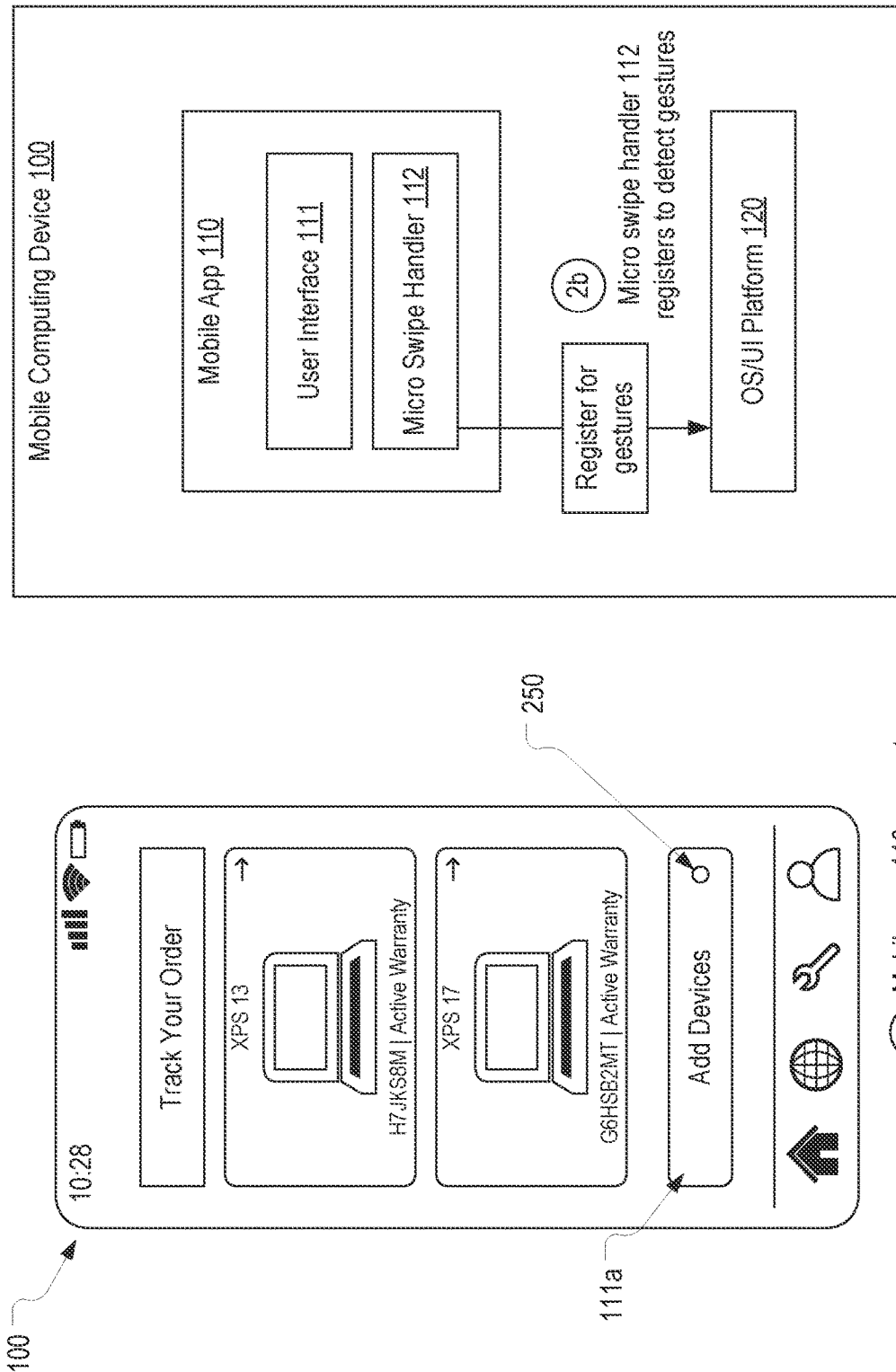

Turning to FIG. 3A, in step 1, it is assumed that a user invokes mobile app 110 on mobile computing device 100. Turning to FIG. 3B, in step 2a, mobile app 110 causes user interface 111 to be displayed on mobile computing device 100. In step 2b, micro swipe handler 112 can register to detect gestures. For example, micro swipe handler 112 could interface with operating system 120 or a user interface platform to be notified when the user touches the screen of mobile computing device 100. If mobile computing device 100 includes Flutter, micro swipe handler 112 could register to detect gestures by creating a GestureDetector and implementing callback methods for the type of gestures that micro swipe handler 112 desires to detect such as for drag start, drag update, and drag end events.

Figure 3C:
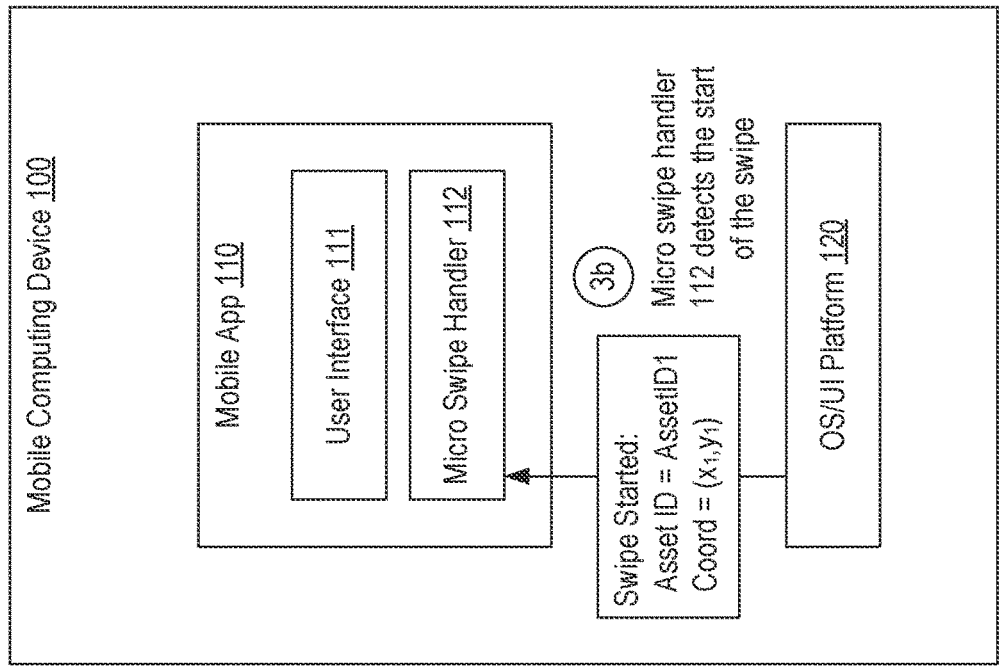
Figure 3C:
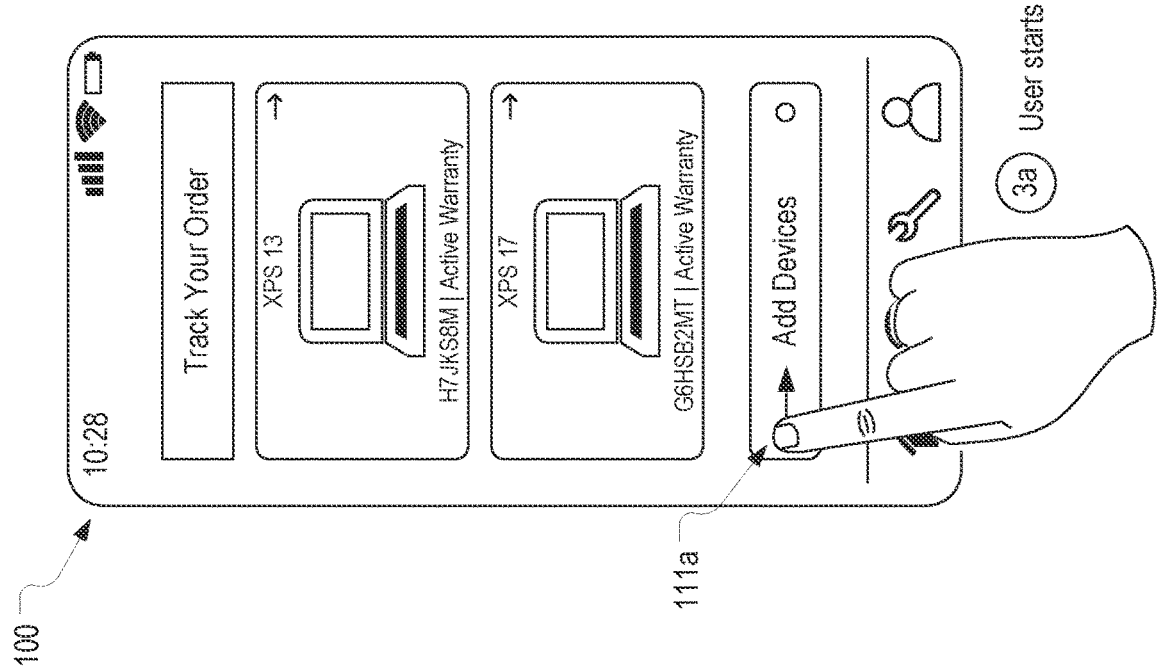

Turning to FIG. 3C, in step 3a, it is assumed that the user starts a swipe on button 111a. In step 3b, micro swipe handler 112 can detect the start of the swipe. For example, micro swipe handler 112 could be notified of a swipe started event which identifies or is associated with the asset ID of button 111a and that identifies the coordinates $(x_1, y_1)$ where the swipe started. These coordinates could be global coordinates (i.e., a position on the screen) or local coordinates (i.e., a position relative to button 111a).

Figure 3D:
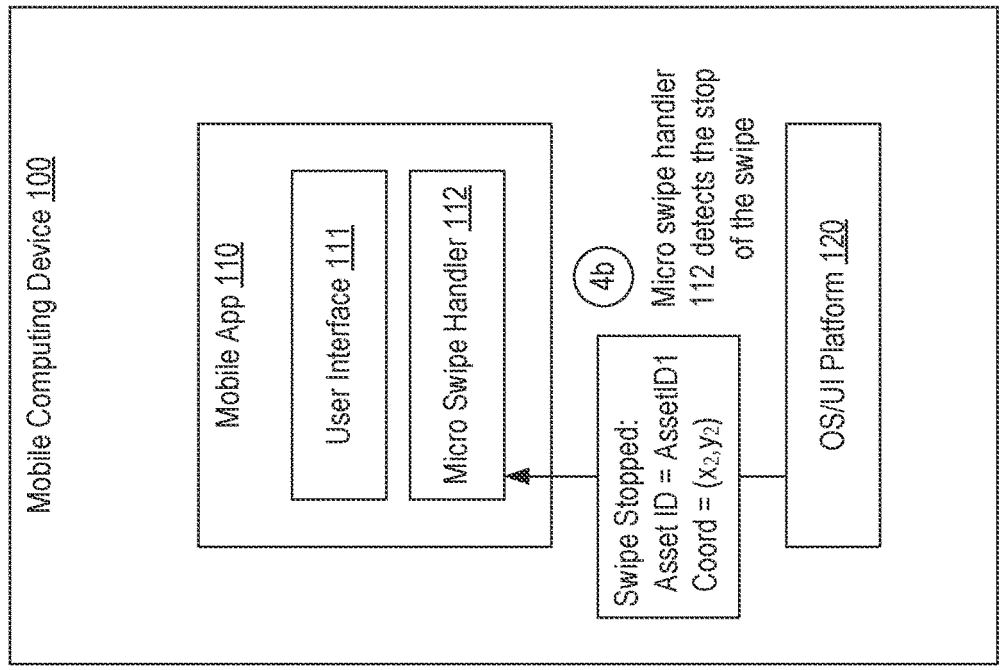
Figure 3D:
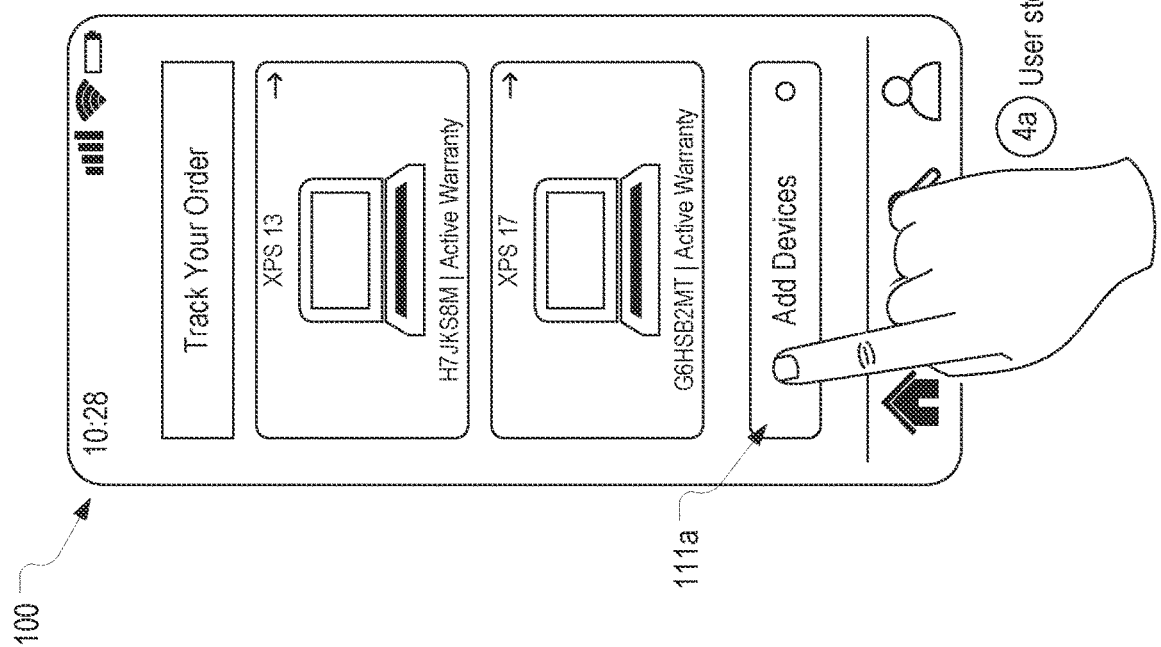

Turning to FIG. 3D, in step 4a, it is assumed that the user stops the swipe after moving his or her finger a short distance overtop button 111a. In step 4b, micro swipe handler 112 can detect the stop of the swipe. For example, micro swipe handler 112 could be notified that the swipe has continued to a second set of coordinates $(x_2, y_2)$ before stopping. In some embodiments, such as when Flutter is the user interface platform, steps 3b and 4b could entail handling the onHorizontalDragStart event, one or more onHorizontalDragUpdate events, and the onHorizontalDragEnd event including processing the associated details objects in which the coordinates are defined.

Turning to FIG. 3E, in step 5a, micro swipe handler 112 can determine if a micro swipe has occurred. For example, after step 4b, micro swipe handler 112 can know that a swipe occurred and can calculate how long the swipe was (e.g., by using the coordinates provided in a DragStartDetails object and coordinates provided in each DragUpdateDetails object generated during the swipe to determine how far the user dragged his or her finger along the screen). Micro swipe handler 112 can define a threshold distance and can determine that a micro swipe has occurred if the length of the swipe is less than or equal to the threshold distance. In some embodiments, this threshold distance could be a distance equivalent to 20 pixels of the screen. In some embodiments, micro swipe handler 112 can determine that a micro swipe has occurred if the length of the swipe is greater than or equal to a lower threshold (e.g., 15 pixels) and less than or equal to an upper threshold (e.g., 20 pixels). Although this example involves a horizontal micro swipe, a vertical micro swipe could be detected in the same manner.

In step 5b, and when micro swipe handler 112 has determined that a micro swipe has occurred, micro swipe handler 112 can send a micro swipe request to micro swipe management server 210. This micro swipe request can identify the asset ID of the user interface element on which the micro swipe occurred which is AssetID1 in this example. In some embodiments, micro swipe handler 112 may include other parameters in the micro swipe request such as a user ID, language, locale, etc. of the user logged in to mobile application 110.

Figure 3F:
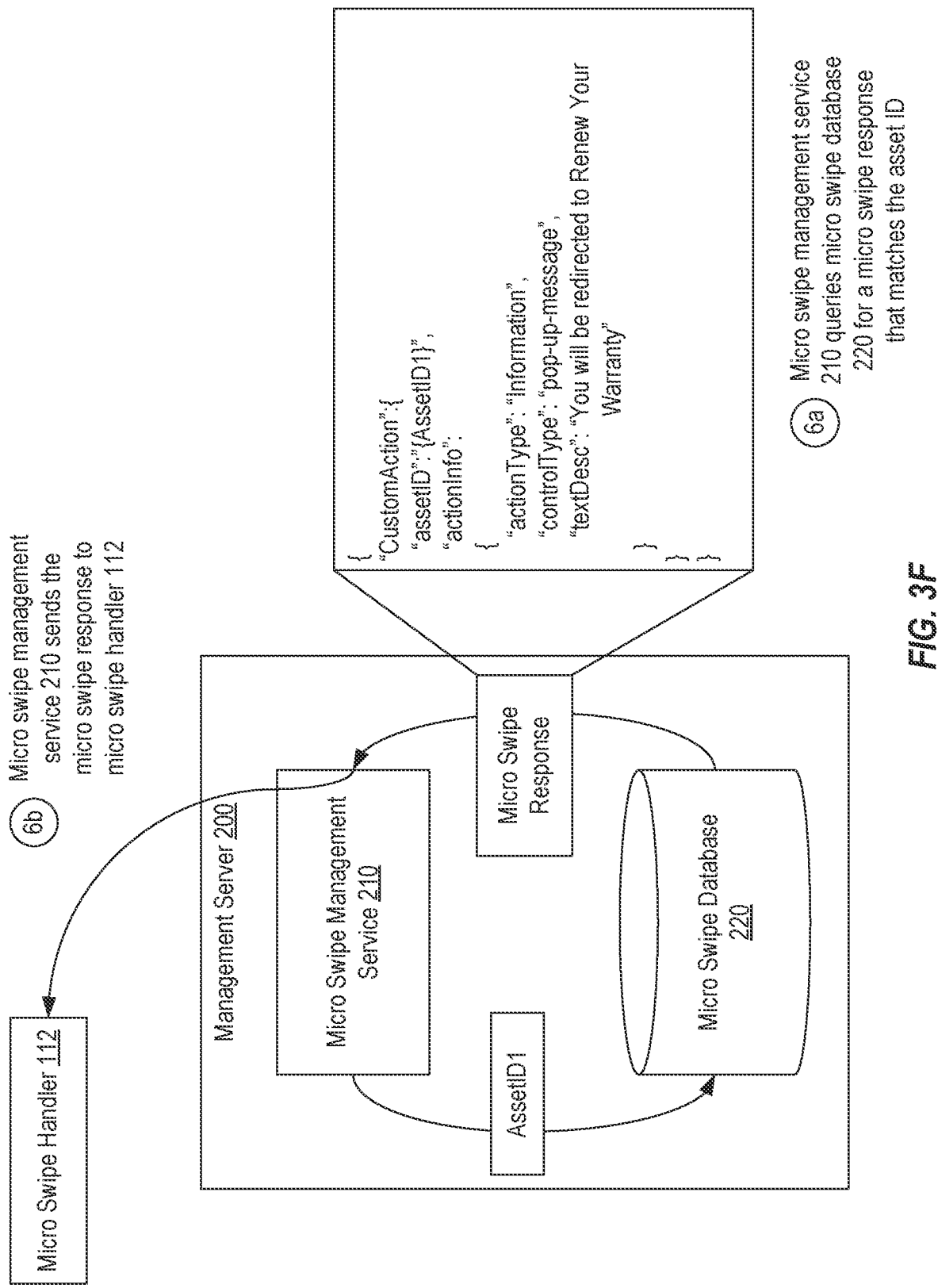

Turning to FIG. 3F, in step 6a, micro swipe management server 210 can query micro swipe database 220 for a micro swipe response that is associated with button 111a such as by using the asset ID provided in micro swipe request. In this example, it is assumed that a micro swipe response is defined for the asset ID (assetID1) of button 111a which defines a custom user interface response having an action type of "information," a control type of "pop-up-message," and a text description of "You will be redirected to Renew Your Warranty." In other words, the custom user interface response for a micro swipe on button 111a is to generate a pop-up that provides information about what will happen if the user selects button 111a.

As described below, a micro swipe response could define other action and control types. Also, in some embodiments, multiple micro swipe responses could be associated with the same user interface element (e.g., with the same asset ID) and one or more other parameters (e.g., user ID, language, locale, etc.) could be used to select one of the micro swipe responses. In short, a developer, administrator, or other user could create a micro swipe response to define any suitable custom user interface response for a micro swipe.

In step 6b, micro swipe management service 210 can return the micro swipe response to micro swipe handler 112. In some embodiments, micro swipe management service 210 may return a single matching micro swipe response. In embodiments where multiple matching micro swipe responses exist, micro swipe management service 210 could provide each matching micro swipe response to micro swipe handler 112 which in turn could use additional information or logic to select one of the micro swipe responses to be used to generate the custom user interface response to the micro swipe.

Figure 3G:
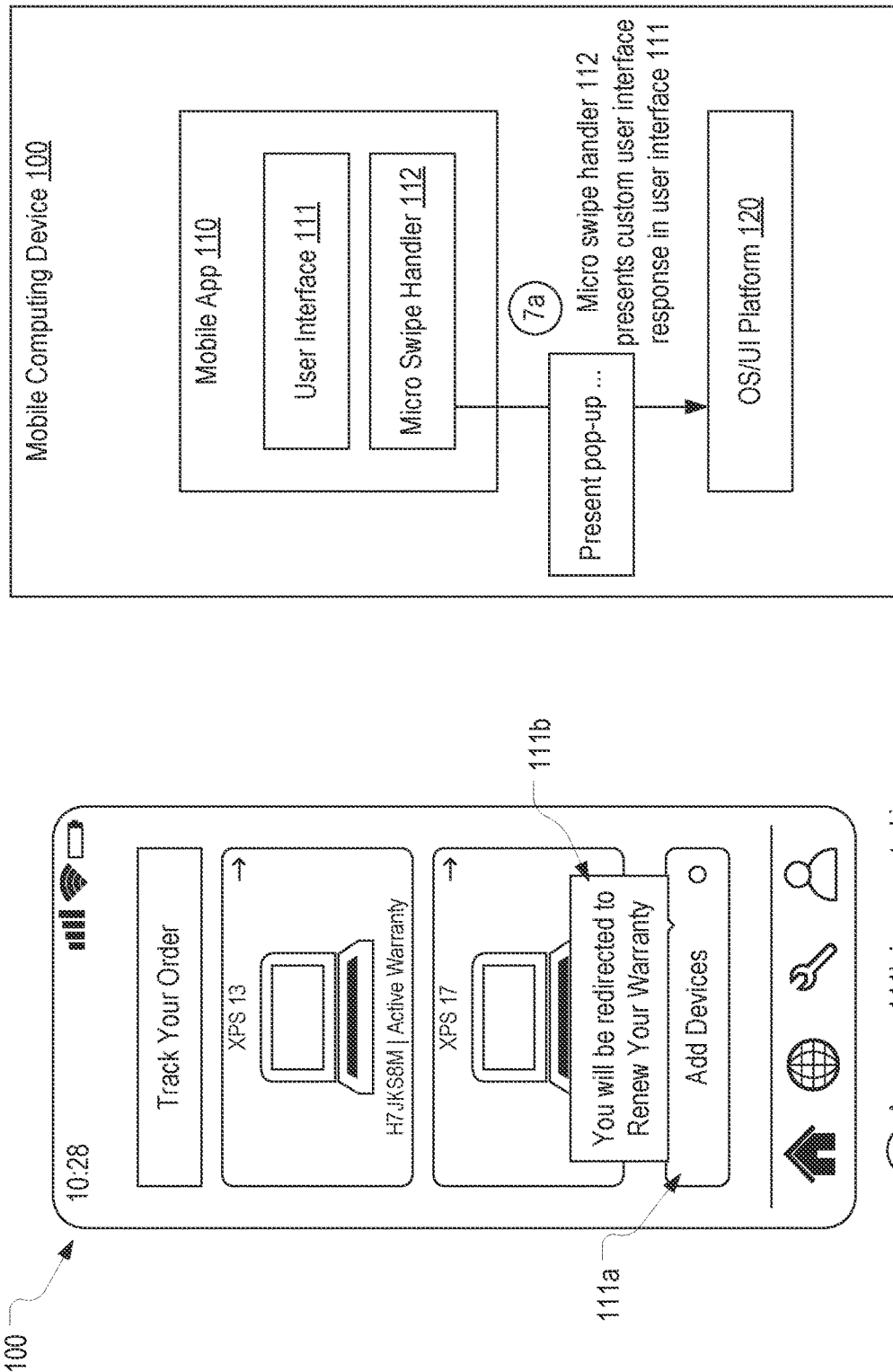

Turning to FIG. 3G, in step 7a, micro swipe handler 112 can cause content of the micro swipe response to be presented in user interface 111. For example, micro swipe handler 112 could determine that the control type defined in the micro swipe response is a pop-up message and could interface with operating system 120 and/or a user interface platform to cause, in step 7b, a pop-up 111b to be generated in user interface 111 over or near button 111a where pop-up 111b can include the text description defined in the micro swipe response. Accordingly, in response to the user's micro swipe on button 111a, user interface 111 now includes pop-up 111b that informs the user that selecting button 111a will cause the user to be redirected to a Renew Your Warranty screen of user interface 111. In this way, the user can determine the functionality of button 111a without having to select button 111a to see what happens.

Figure 4:
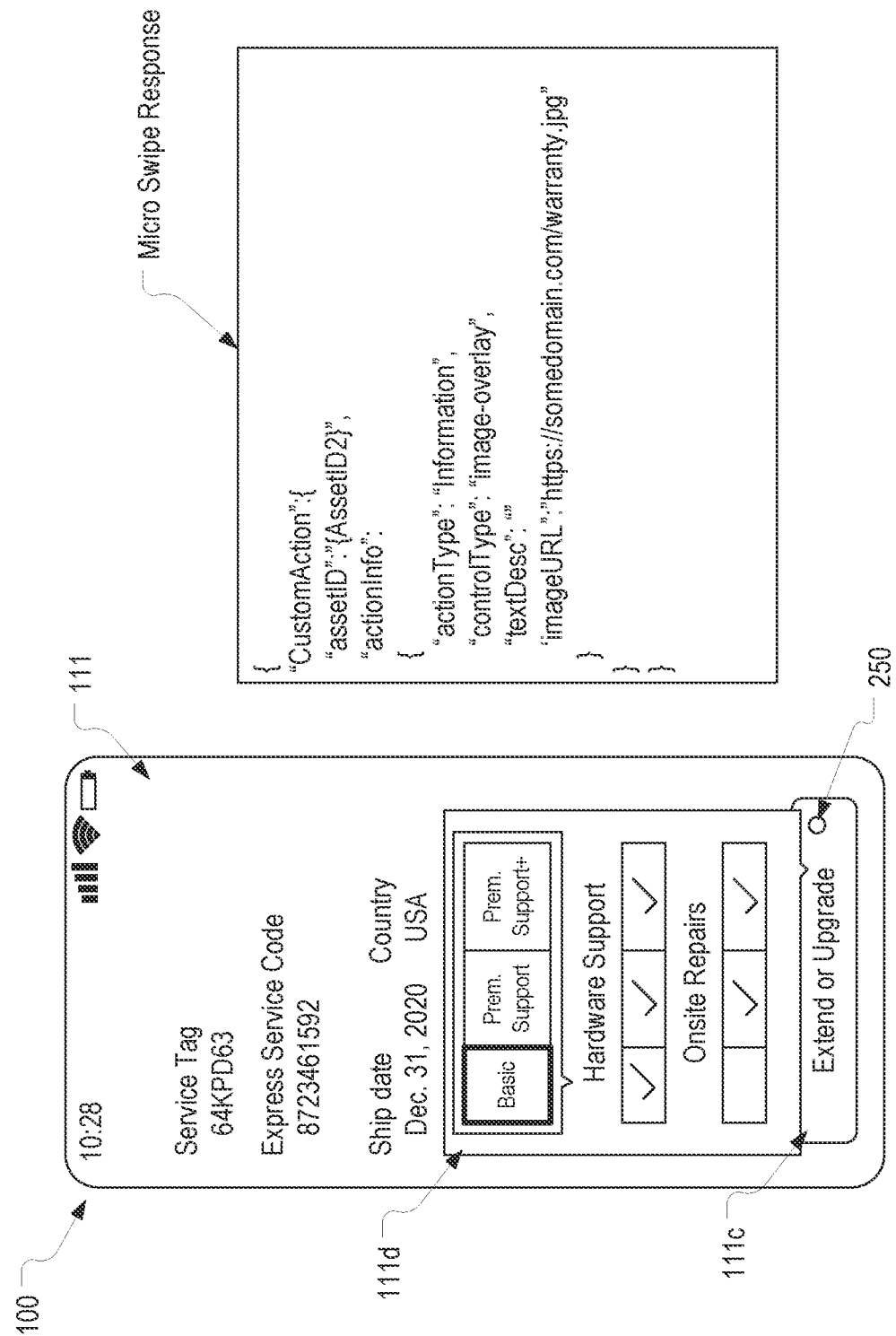
FIG. 4 provides an example of a custom user interface response that can be generated in response to a micro swipe in accordance with embodiments of the present invention.

FIG. 4 provides another example of a micro swipe response that provides a different custom user interface response. In this example, a button 111c is configured to support micro swipes and therefore includes micro swipe indicator 250. The micro swipe response defined for button 111c, which is assumed to have an asset ID of assetID2, has an action type of "information," a control type of "image-overlay," and defines a URL for the image to be overlaid. Accordingly, when the user performs a micro swipe on button 111c, an image overlay 111d containing the referenced image (warranty.jpg) can be presented over button 111c as the custom user interface response.

Notably, the custom user interface response that occurs in response to a micro swipe on a user interface element can be updated as desired by updating or creating the micro swipe response in micro swipe database 220 without otherwise adjusting user interface 111. This facilitates customizing and updating user interface 111 to present the most useful custom user interface response for a given user interface element.

The above-described functionality could also be performed for other types of user input. For example, rather than or in addition to retrieving a custom user interface response when a micro swipe is detected, a handler could be configured to detect a long press (i.e., a touch and hold) on a user interface element and retrieve a custom user interface response to be presented in response to the long press.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for supporting micro swipes for generating custom user interface responses, the method comprising:
    detecting, at a micro swipe handler of a mobile application that is executing on a mobile computing device, that a user has performed a swipe on a user interface of the mobile application;
    determining that the swipe is a micro swipe;
    in response to determining that the swipe is a micro swipe, sending a micro swipe request to a micro swipe management service;

receiving, from the micro swipe management service, a micro swipe response that defines a custom user interface response; and generating the custom user interface response in the user interface of the mobile application.

2. The method of claim 1, wherein determining that the swipe is a micro swipe comprises determining that a length of the swipe is less than a defined threshold.

3. The method of claim 1, wherein determining that the swipe is a micro swipe comprises determining that a length of the swipe is between a lower threshold and an upper threshold.

4. The method of claim 1, wherein determining that the swipe is a micro swipe comprises calculating a length of the swipe using coordinates of the swipe.

5. The method of claim 1, wherein the micro swipe request includes an identifier of a user interface element on which the micro swipe was performed.

6. The method of claim 5, wherein the micro swipe response is associated with the identifier of the user interface element.

7. The method of claim 6, wherein the micro swipe request includes one or more additional parameters and the micro swipe response is associated with the one or more additional parameters.

8. The method of claim 7, wherein the one or more additional parameters includes one or more of an identifier of a user that is logged in to the mobile application, a language of the user, or a locale of the user.

9. The method of claim 1, wherein the custom user interface response comprises a textual description.

10. The method of claim 1, wherein the custom user interface response comprises an image.

11. The method of claim 1, wherein generating the custom user interface response in the user interface of the mobile application comprises causing another user interface element to be displayed on a user interface element on which the user performed the micro swipe.

12. The method of claim 1, further comprising:
detecting, at the micro swipe handler, that the user has performed a touch and hold on the user interface of the mobile application;
determining that the touch and hold is a long press;
in response to determining that the touch and hold is a long press, sending another request to the micro swipe management service;
receiving, from the micro swipe management service, another response that defines a second custom user interface response; and
generating the second custom user interface response in the user interface of the mobile application.

13. The method of claim 1, further comprising:
updating, at the micro swipe management service, the micro swipe response to define a different custom user interface response;
in response to determining that the user has subsequently performed a second micro swipe on the user interface of the mobile application, sending a second micro swipe request to the micro swipe management service;
receiving, from the micro swipe management service, the micro swipe response that defines the different custom user interface response; and
generating the different custom user interface response in the user interface of the mobile application.

14. One or more computer storage media storing computer executable instructions which when executed implement a method for supporting micro swipes for generating custom user interface responses, the method comprising:
detecting, at a micro swipe handler of a mobile application that is executing on a mobile computing device, that a user has performed a swipe on a first user interface element of a user interface of the mobile application;
determining that the swipe is a micro swipe by calculating that a length of the swipe is less than a threshold;
in response to determining that the swipe is a micro swipe, sending a micro swipe request to a micro swipe management service, the micro swipe request including an identifier of the first user interface element;
receiving, from the micro swipe management service, a micro swipe response that defines a custom user interface response, the micro swipe response being associated with the identifier of the first user interface element; and
generating the custom user interface response in association with the first user interface element in the user interface of the mobile application.

15. The computer storage media of claim 14, wherein the micro swipe request also includes one or more other parameters, and the micro swipe response matches the one or more other parameters.

16. The computer storage media of claim 14, wherein the swipe is determined to be a micro swipe by calculating that the length of the swipe is greater than a lower threshold and less than an upper threshold.

17. The computer storage media of claim 14, wherein generating the custom user interface response in association with the first user interface element in the user interface of the mobile application comprises causing a second user interface element to be presented on or adjacent to the first user interface element.

18. The computer storage media of claim 17, wherein generating the custom user interface response in association with the first user interface element in the user interface of the mobile application further comprises presenting text or an image in the second user interface element, the text or the image being contained in the micro swipe response.

19. A system comprising:
a management server hosting a micro swipe management service; and
at least one mobile computing device on which a mobile application is installed, the mobile application including a user interface and a micro swipe handler, wherein the micro swipe handler is configured to implement a method for supporting micro swipes for generating custom user interface responses in the user interface while the user interface is displayed on the respective mobile computing device, the method comprising:
detecting that a user has performed a swipe on a first user interface element in the user interface;
determining that the swipe is a micro swipe;
in response to determining that the swipe is a micro swipe, sending a micro swipe request to the micro swipe management service;
receiving, from the micro swipe management service, a micro swipe response that defines a custom user interface response; and
causing the user interface to be updated to include the custom user interface response.

20. The system of claim 19, wherein the micro swipe request includes an identifier of the first user interface element and the micro swipe response is associated with the identifier of the first user interface element.

\* \* \* \* \*